May 10, 1938. W. A. GARRATT 2,116,624
ADJUSTING MECHANISM FOR TRANSMISSIONS
Filed Dec. 3, 1936 3 Sheets-Sheet 1
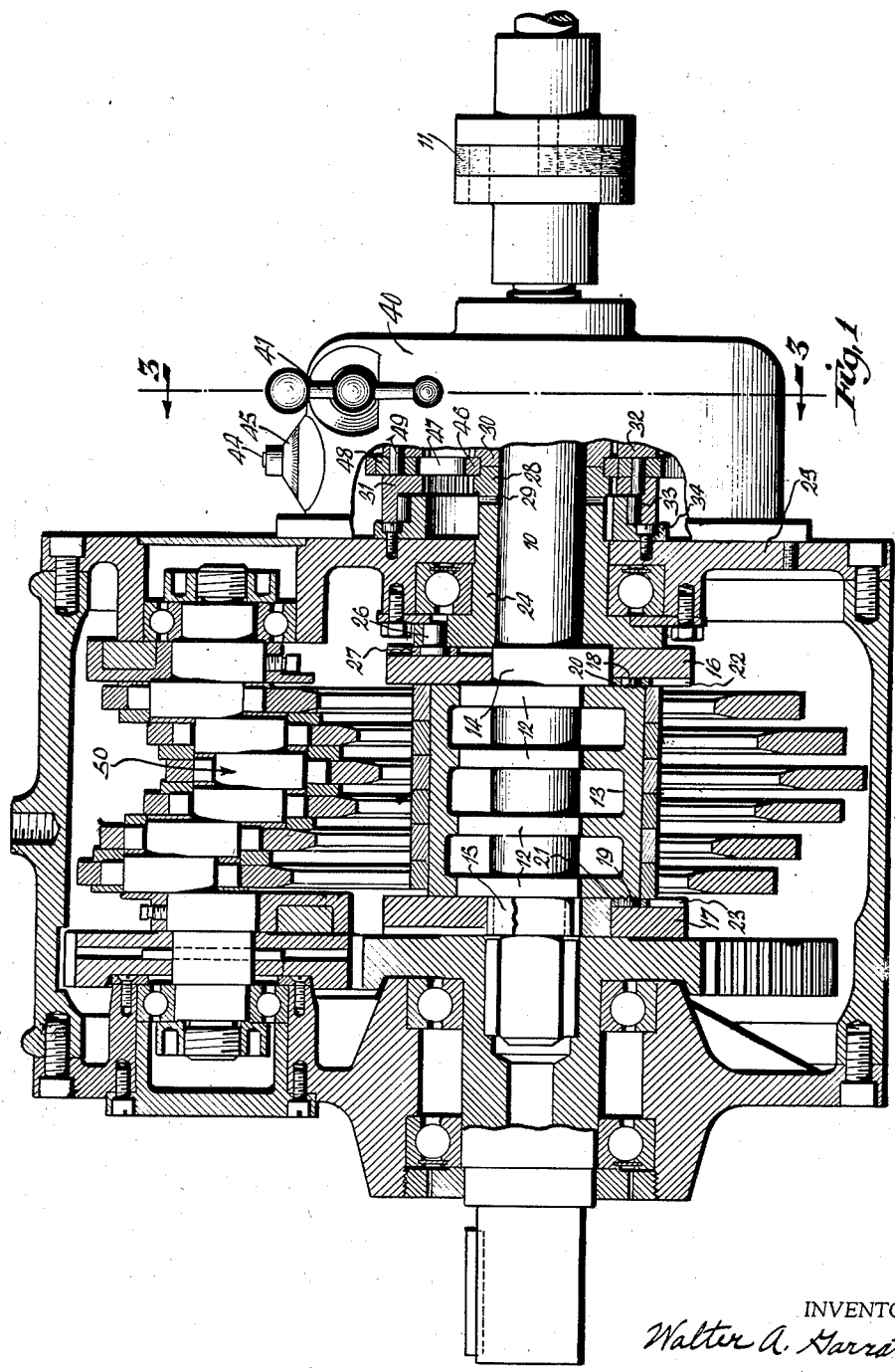
INVENTOR.
Walter A. Garratt
BY
Wood & Wood ATTORNEYS.

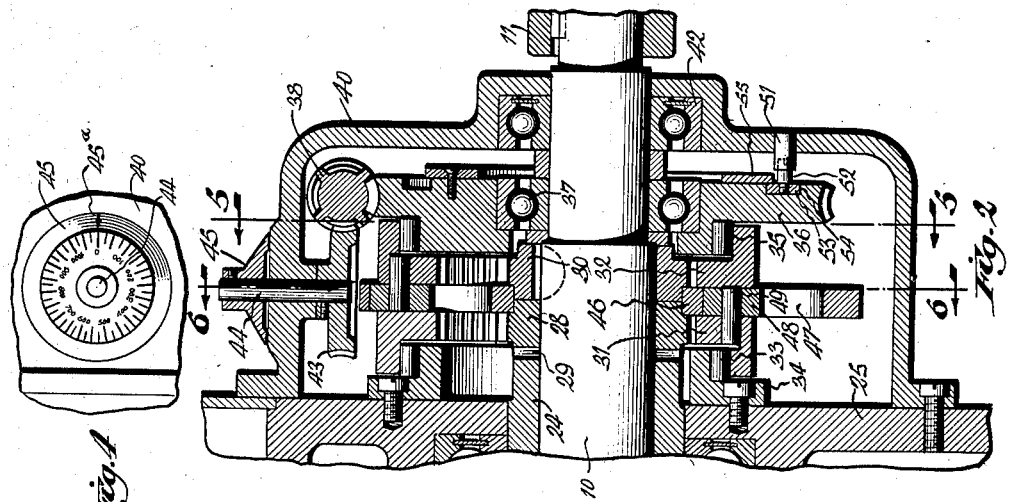
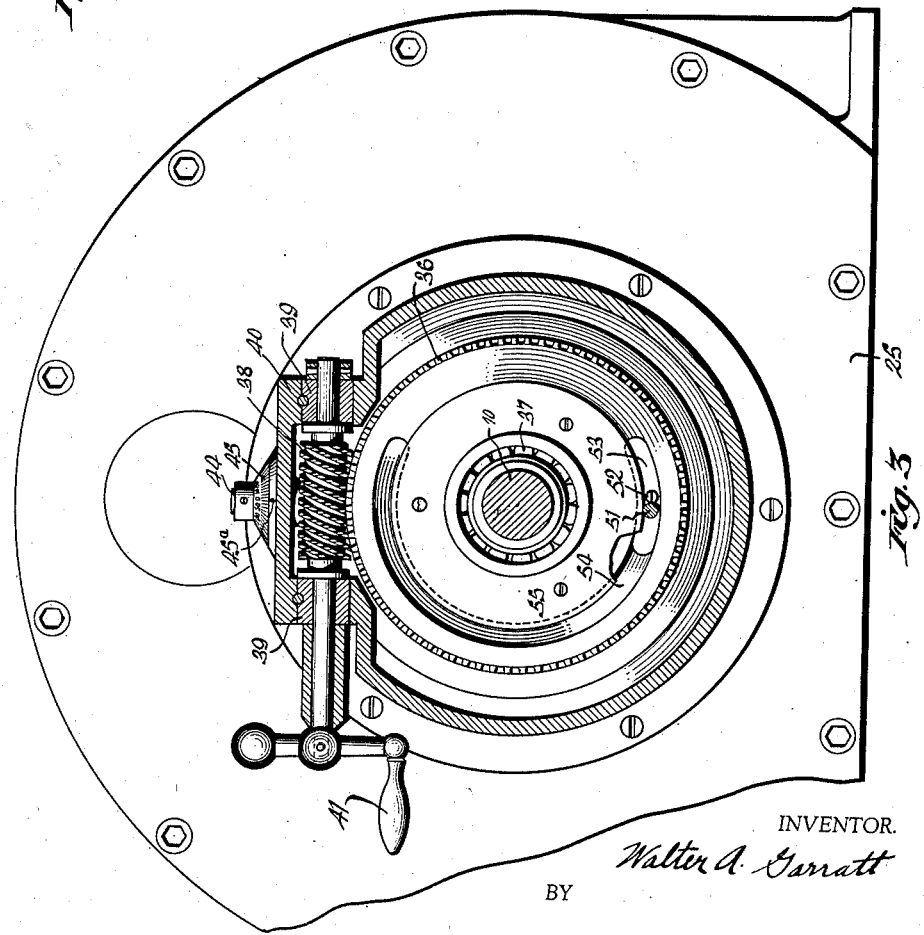

Patented May 10, 1938

2,116,624

UNITED STATES PATENT OFFICE 2,116,624

ADJUSTING MECHANISM FOR TRANSMISSIONS

Walter A. Garratt, Covington, Ky.

Application December 3, 1936, Serial No. 114,026

7 Claims. (Cl. 74—571)

This invention relates to transmissions and is particularly directed to adjusting means for changing the angular relationship of coaxial shafts for controlling, for example, the delivered speed of a transmission embodying a variable throw eccentric, such as the transmission disclosed in my Patent No. 2,036,626, issued April 7, 1936.

The objects of this invention are: first, to provide a range of adjustment of a variable throw eccentric device with an infinite number of changes in the amount of throw of the eccentric from zero eccentricity up to the maximum throw provided in the design of the machine; second, to provide for adjustment while the mechanism is in motion under load; and third, to provide for automatic locking of the eccentric in any selected position without undue strain on the adjusting parts.

A principal part of many speed varying transmissions known to the art is a variable throw eccentric device and the purpose of the invention herein described is directed particularly to provide means in the mechanisms of variable speed transmissions for shifting or adjusting the variable throw eccentric device with the maximum of convenience and advantage. Also in various mechanisms other than transmissions, the angular relationship of two shafts having a common axis or of a shaft and a sleeve concentric to it may require adjustable variation, that is, one member must be rotated in relation to the other while both are in motion. This invention provides means for such adjustment so that the broad scope of this invention is not confined to speed regulation.

Other objects and further advantages will be more fully apparent from a description of the accompanying drawings in which:

Figure 1 is a longitudinal cross section of a transmission taken through the axis of the shafts and generally illustrating the adjustment means of this invention applied thereto.

Figure 2 is an enlarged portion of Figure 1, taken on the axis of the drive shaft of the transmission and showing the adjustment means in detail.

Figure 3 is a cross sectional view of the machine taken on line 3—3 of Figure 1.

Figure 4 is a fragmentary top plan view of the mechanism showing the indicator dial of the adjustment means.

Figure 5:
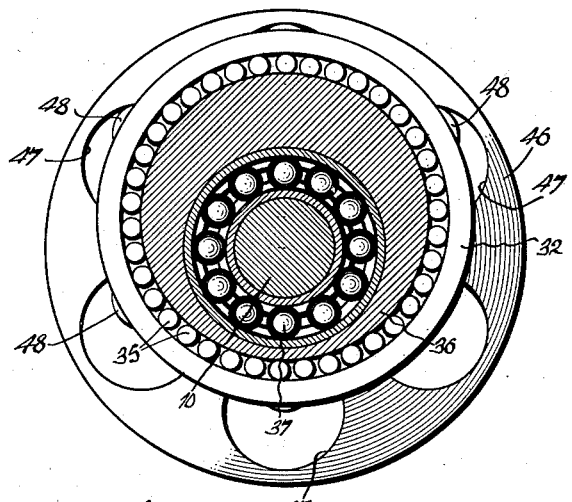
Figure 5 is a sectional view taken on line 5—5 of Figure 2.
Figure 6:
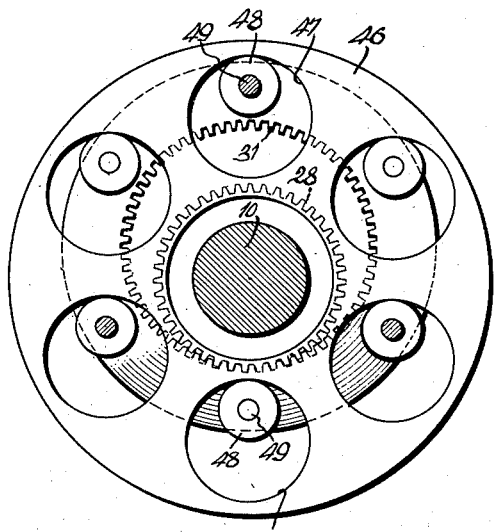
Figure 6 is a sectional view taken on line 6—6 of Figure 2.

Referring to the drawings, 10 indicates the drive shaft coupled by any suitable means, such as 11, to an engine, motor, or other source of power (not shown). On the shaft 10 are formed lobes 12, which are eccentric to the axis of the drive shaft 10, which axis is hereafter called the main axis.

The bushing 13 is fitted rotatively around the lobes 12 and its bore is eccentric to its circumference by the same amount that the circumference of the lobes 12 is eccentric to the main axis. From this it is seen that the circumference of the bushing 13 will vary in eccentricity to the main axis from zero to an amount twice the eccentricity of the lobes 12 to the main axis according to the variation in angular relationship of the bushing 13 to the drive shaft as the bushing is rotated on the lobes. The lobes 12 have their direction of eccentricity varied by means of the adjustment device hereinafter described and may be described as eccentric imparting a variable throw due to the fact that they operate on crank shafts having fixed throws and axes. Lobes 14 and 15 are formed or fixed on the shaft 10 and, together with the eccentric counterweights 16 and 17 rotatively fitted to the lobes 14 and 15, form counterbalances for the lobes 12, the bushing 13, and parts mounted on the bushing. The bushing 13 is coupled to the counterweights 16 and 17 by pins 18 and 19, which are fixed in the bushing and fitted rotatively in shoes 20 and 21 slidably fitted in radial slots 22 and 23 of the counterweights.

A sleeve 24 which is concentric to the drive shaft and journaled in the frame 25 is similarly coupled to the counterweight 16 by the pin 26 and the shoe 27. By this arrangement the angular relationship of the bushing 13 to the drive shaft 10 is maintained the same as the angular relationship of the sleeve 24 to the drive shaft. The connection between the sleeve 24 and the bushing 13 may be traced as sleeve 24 to pin 26, to shoe 27, to counterweight 16, to shoe 20, to pin 18, to bushing 13. Thus the lobes 12 and the sleeve 13 constitute the variable throw eccentric system which it is the purpose of this invention to adjust.

A spur gear 28 (see Figure 2) is fitted rotatively on the drive shaft 10 and is fixed to the sleeve 24 by teeth 29. A spur gear 30 is keyed to the drive shaft 10. The two gears 28 and 30 are duplicates as to gear teeth and pitch diameters. Bearing in mind the connection of gear 28 to the sleeve 24 and of the sleeve to the bushing 13 and of the gear 30 to the drive shaft 10, it is seen that rotation of the gears 28 and 30 relative to each other will change the eccentricity of the bushing 13 to the main axis.

Two internal ring gears or fixed throw eccentric members 31 and 32, duplicates of each other, are mounted eccentrically to the main axis and mesh with the spur gears 28 and 30 respectively. The eccentricity of the gear 31, both in direction and amount, is maintained constant by being journaled by roller bearings 33 around the circular bearing collar 34, which is fixed to the frame 25 of the machine.

The internal gear 32 is similarly mounted by roller bearings 35 on an eccentric hub of the worm wheel 36. However, the direction of eccentricity of the gear 31 cannot be varied, because the collar 34 is fixed to the frame of the machine; whereas, the direction of eccentricity of the gear 32 can vary because the worm wheel 36 is journaled on ball bearings 37 on the drive shaft 10.

Means for revolving the center of the gear 32 about the main axis, that is, for changing the direction of eccentricity of the gear 32, and resetting the relative positions of the lobes 12 and bushing 13 of the variable throw eccentric system is provided as follows:

A worm 38 meshes with the worm wheel 36 and is rotatively mounted in the bearing bushings 39 in the casing 40. The worm is provided with a crank handle 41 for manual control. This casing 40 is fastened to the main frame 25 of the machine and is fitted with a bearing 42 for journaling the drive shaft 10. The worm 38 has a double thread, the right-hand thread engaging the worm wheel 36 and the left-hand thread engaging a secondary worm wheel 43 which is pinned to a shaft 44. The shaft 44 extends upward through a bore in the casing which it fits rotatively and to its upper end is attached a micrometer index dial 45. The index lines of this dial 45 register with reference to a witness mark 45a on the adjacent face of the casing.

Between the two pairs of gears, each pair comprising one spur gear and one internal gear, is fitted rotatively with reference to the main axis and in a plane at right angles to the main axis, the coupler plate 46. This coupler plate has, formed in it, six circular holes 47 disposed about the main axis equidistant from each other and equidistant from the center of the plate which is the main axis. The six holes 47 each receive a roller 48 and the six rollers are duplicates of each other. Of these six rollers, three are attached to the internal gear 31 and three to the other internal gear 32. They are attached by the pins 49 upon which they fit rotatively. The pins are parallel to the main axis. The rollers of one set of three associated with one gear preferably are positioned alternately with respect to the rollers of the other set, or, in other words, in each set of three the rollers are disposed equidistant from each other and equidistant from the center of the gear with which they are associated.

The coupler plate or member 46 prevents relative rotation, on their own centers, of the two internal gears 31 and 32. But, because the diameter of each of the six holes 47 in the coupler plate is twice the eccentricity of the centers of the gears 31 and 32 to the main axis plus the diameter of the rollers 48, together with the fact that the centers of the six holes are spaced from the main axis by the same distances that the center of each roller is spaced from the center of the gear to which it is attached; it follows that the centers of the two eccentric internal gears may revolve about the main axis relatively to one another, and this movement can be accomplished by manual operation of the crank handle 41. This relative revolution of the two centers of the eccentric internal gears about the main axis, causes relative rotation in the opposite direction of the spur gears 28 and 30 which, as explained above, results in change of eccentricity of the bushing 13 to the main axis, and this is the primary purpose of the invention.

It is obvious that it is not necessary that the number of holes in the coupler plate and the associated rollers be limited to six. A change in this number would not depart from the scope of this invention.

The adjusting or control device of this invention is shown applied to a transmission which is identical to that disclosed in the mentioned Patent #2,036,626. Its construction beyond those parts described in detail herein, that is, the variable throw eccentric system, is unimportant to the present invention. Generally described, the structure of this transmission incorporates the variable throw eccentric system described heretofore, surrounded by a fixed throw eccentric system, generally indicated at 50, with motion from one to the other, accomplished by members interposed between them, the relative speed of one system to the other being relative to the throw of the variable throw eccentric system.

The operation of this device may now be described as follows: When the drive shaft is rotated for the delivery of power to the transmission, the gear 30 rotates with the drive shaft and causes the internal gear 32 to rotate on its own center. The gear 32, coupled to the gear 31 by the coupler plate 46 and the rollers 48, causes the internal gear 31 to rotate on its center which, in turn, drives the gear 28, and the gear 28 rotates at the same rate as the gear 30. Therefore, power is delivered to the eccentric device of the transmission without change in the eccentricity of the variable throw eccentric system, i. e. relationship of lobes 12 and bushing 13.

Now whether the whole mechanism is operating under load or running idle or stationary, the crank handle 41 may be turned by hand. This causes the worm wheel 36 to rotate and thus the center of the eccentric internal gear 32 is revolved about the main axis without changing its rate of rotation on its own center. The revolution of the center of the eccentric internal gear 32 about the main axis will cause a rotation of the gear 30 relative to the gear 28 whether or not they are both in motion relative to the earth. Such a relative rotation will cause a change in the eccentricity of the variable throw eccentric system of the transmission. Variation in the relation of the center of the gear 30 relative to the center of the gear 28, will cause variation in the position of the lobes 12, with respect to the bushing 13 and the throw of the variable throw eccentric system, will be varied.

Turning the crank handle in one direction will increase the eccentricity, and turning it in the other direction will decrease the eccentricity, unless adjustment is started from the position of zero eccentricity, in which case turning the handle either way increases eccentricity, or unless adjustment is started from the position of maximum eccentricity, in which case, turning the handle either way will decrease eccentricity. By means of the dial 45, properly calibrated, the amount of the eccentricity at any time and the amount of change by operating the crank handle may be definitely known.

The worm wheel 36 may be limited (as shown) in its rotative or throw adjusting movement, whereby the variable throw system of the transmission may have its eccentricity varied from zero to maximum, or maximum to zero, but with definite stops for the wheel at these limits compelling reversive rotation when either limit is reached.

To this end a fixed stop pin 51 is provided, mounted in the casing 40 and projecting into the path of movement of a moving stop pin 52 carried by the wheel 36. It will be seen that, with pin 52 as a fixed part of the wheel, substantially a complete revolution of the worm wheel is permitted. However, in order to accomplish 180° change in the rotation of the lobes 12 and bushing 13, for the entire range of throw of eccentricity of the variable throw system, due to the ratio of the gearing, that is, between gears 30 and 32 and gears 29 and 31, 1½ turns of the worm wheel are required.

For this reason, the moving pin 52 is mounted on an arcuate shoe 53, slidably mounted in a semi-circular groove 54 in the face of the worm wheel. Retaining ring 55 fixed to the face of the worm wheel overlaps the groove and maintains the shoe against displacement from the groove. Observing Figure 3, assuming rotation of the worm wheel to be counterclockwise, it will be apparent that, when the moving stop element 52 makes a complete revolution, another half turn of the worm wheel is permitted due to the fact that the shoe slides around the groove, permitting 180° of movement.

Having described my invention, I claim:

1. In a device of the class described, a drive shaft, a variable throw eccentric system including an eccentric fixed to said drive shaft and an eccentric member of variable throw surrounding the eccentric on the drive shaft, an adjustment device for said variable throw eccentric system, including, a first eccentric member of fixed throw in fixed driving relationship to the drive shaft, a second eccentric member of fixed throw in driving connection with and having its direction of eccentricity fixed in relation to the eccentric member of variable throw, a coupling member between the two fixed throw eccentric members precluding rotation of said fixed throw eccentric member relative to each other on their own centers but permitting their centers to revolve relative to each other about the axis of said shaft, and adjustable means including eccentric bearings on which the fixed throw eccentric members are journaled for varying the positions relative to each other of the centers of the fixed throw eccentric members about the drive shaft axis.

2. In a device of the class described, a drive shaft, a first eccentric member, of fixed throw in fixed driving relationship to said drive shaft, a second eccentric member of fixed throw loosely mounted for rotative adjustment about the drive shaft, a coupling member between the two fixed throw eccentric members precluding rotation of said fixed throw eccentric members relative to each other on their own center but permitting their centers to revolve relative to each other about the axis of said shaft and, adjustable means including eccentric bearings on which the fixed throw eccentric members are journaled for varying the positions relative to each other of the center of the fixed throw eccentric members about the drive shaft axis.

3. In a device of the class described a principal shaft, a sleeve concentric therewith and rotatable thereon, a first eccentric member driven from the shaft, a second eccentric member driving the concentric sleeve, a coupler member between the first and second eccentric members precluding rotation of them relatively to each other on their own centers and permitting their centers to revolve relatively to each other about the said shaft, bearings, one for each of the eccentric members, eccentric to the shaft and concentric to the eccentric members for maintaining the eccentricity to the shaft member of the two eccentric members and a device engaging the said bearing for the first eccentric member for changing the direction of the eccentricities to the said shaft of the said bearings relatively to each other.

4. In a device of the class described, a frame, a shaft journaled in the frame, a sleeve concentric therewith and rotatable thereon, a first eccentric member driven from the shaft, a second eccentric member driving the concentric sleeve, a coupler member between the first and second eccentric members precluding rotation of them relatively to each other on their own centers and permitting their centers to revolve relatively to each other about the said shaft, bearings, one for each of the eccentric members, eccentric to the shaft and concentric to the respective eccentric members for maintaining the eccentricity to the shaft member of the two eccentric members, one bearing fixed to the frame and the other bearing rotatable on the said shaft, an adjusting device engaging the bearing rotatable on the said shaft for rotating said latter bearing.

5. In a device of the class described, a frame, a shaft journaled in the frame, a sleeve concentric therewith and rotatable thereon, a first eccentric member driven from the shaft, a second eccentric member driving the concentric sleeve, a coupler member between the first and second eccentric members precluding rotation of them relatively to each other on their own centers and permitting their centers to revolve relatively to each other about the said shaft, bearings, one for each of the eccentric members, eccentric to the shaft and concentric to the respective eccentric members for maintaining the eccentricity to the shaft member of the two eccentric members, one bearing fixed to the frame and the other bearing rotatable on the said shaft, worm gear teeth formed on the bearing rotatable on the said shaft, a worm shaft rotatably mounted in the frame engaging the said worm gear teeth and provided with a crank handle for rotating the bearing on said shaft.

6. In a device of the class described a frame, a shaft journaled in the frame, a sleeve concentric to and rotatable on the shaft, a first spur gear concentric to and rotatively mounted on the shaft, a second spur gear with gear teeth equal in number to the first spur gear concentric to and non-rotatively connected to the sleeve, a first internally toothed gear engaging the first spur gear, a second internally toothed gear having gear teeth of equal number to the first internally toothed gear engaging the second spur gear, a first bearing member supporting the first internally toothed gear and a second bearing member supporting the second internally toothed gear, the two bearing members having equal eccentricities to the shaft, one bearing member mounted rotatively on the shaft and the other bearing member fixed non-rotatively to the frame, a coupler plate disposed between the two internally toothed gears in a plane parallel to the two planes of the two internally toothed gears and perpendicular to the axis of the shaft and provided with circular openings symmetrically disposed about the shaft, projections from the internally toothed gears engaging said openings, the said coupler plate adapted to preclude rotation of either internally toothed gear on its own center relatively to the other and to permit the centers of the two internally toothed gears to revolve relatively to each other about the axis of the shaft and a control device including worm teeth formed on the bearing member mounted rotatively on the shaft, a worm journaled in the frame and meshing with said worm teeth and a crank handle for said worm.

7. In a device of the class described, a drive shaft, a first spur gear fixed to said shaft, a first ring gear having internal teeth in mesh with said spur gear, a rotatively mounted bearing member loosely mounted on the shaft and having an eccentric bearing supporting said first ring gear with its center disposed eccentrically of the axis of the shaft, a second spur gear loosely mounted on the drive shaft, a second ring gear having internal teeth in mesh with the second spur gear, a non-rotative bearing element fixed in position and providing an eccentric bearing portion for the second ring gear for rotatively supporting said ring gear with its center eccentric to the axis of the shaft by the same amount as the center of the first ring gear, a disc disposed between the respective ring gears, said disc having circumferentially arranged evenly spaced openings therein, having their axes parallel to the axis of the drive shaft, rollers alternately journaled upon the respective ring gears each being disposed in contact with the wall of a respective opening in which it is located, the diameter of said openings in each instance being twice the eccentricity of the centers of the ring gears to the shaft axis plus the diameter of the roller contained therein, and means for rotating said rotatively mounted bearing element.

WALTER A. GARRATT.